Sept. 18, 1928.
N. A. OLUND
1,684,967
AUTOMOBILE HEATER
Filed June 19, 1926
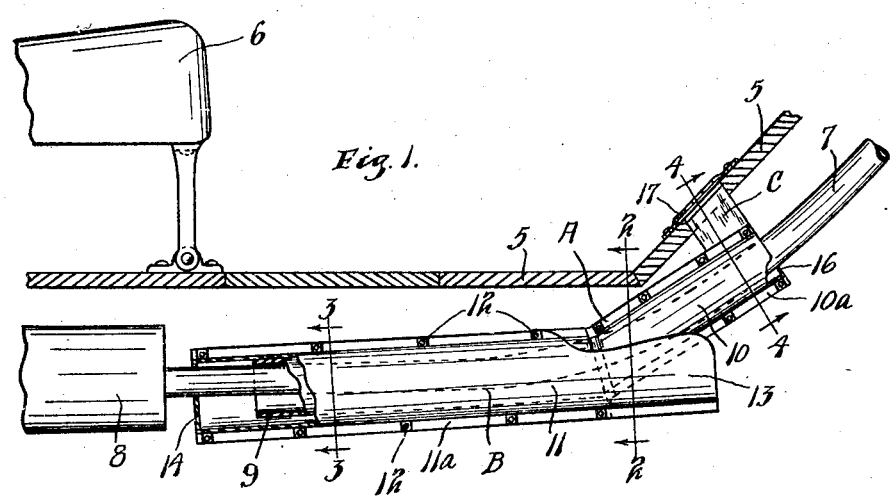
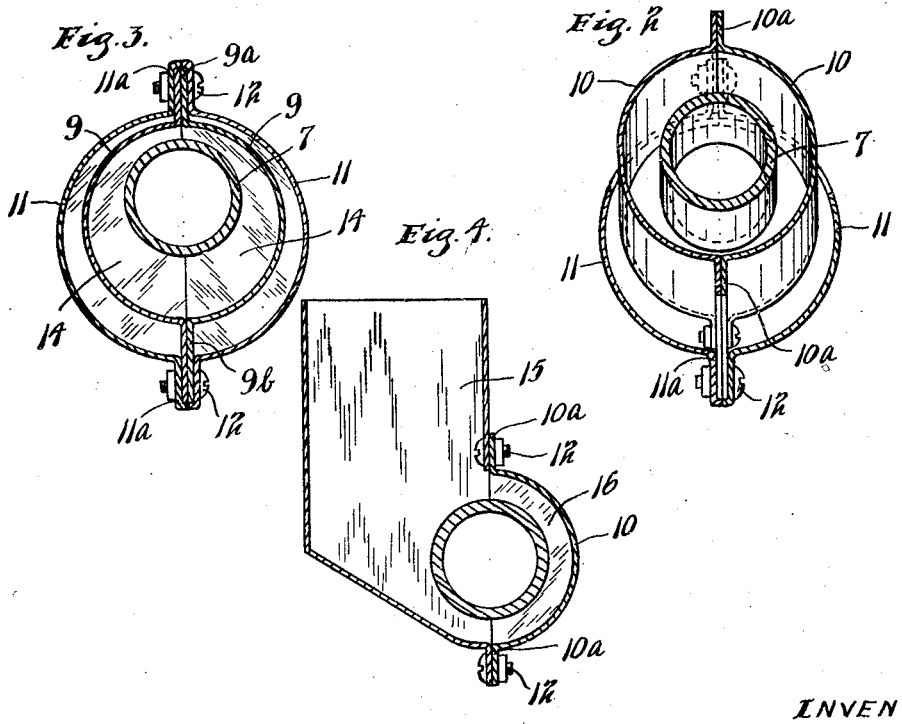
INVENTOR.
N. A. OLUND.
BY HIS ATTORNEYS.

Patented Sept. 18, 1928.

1,684,967

UNITED STATES PATENT OFFICE.

NELS A. OLUND, OF CAMBRIDGE, MINNESOTA.

AUTOMOBILE HEATER.

Application filed June 19, 1926. Serial No. 117,164.

This invention relates to automobile heaters and especially to such devices adapted to be applied to the exhaust pipe of an internal combustion engine.

It is the main object of this invention to provide a highly efficient automobile heater adapted to enclose a portion of the exhaust pipe and to deliver a quantity of heated air forwardly of the casing in the forward portion of the automobile body.

A further object is to provide such a device, adapted for disposition upon a curved portion of an exhaust pipe, means being provided for introducing a quantity of air into the main heater casing and for setting up therethrough a relatively slow circulation of air over the hot portion of the exhaust pipe, delivering said heated air into the interior of the automobile body.

A more specific object of the invention is to provide an automobile heater having a heater casing adapted to be disposed about a curved portion of an exhaust pipe with its forward end disposed at a higher level than its rear end, and an intake passage disposed about the heater casing and communicating therewith at the rear end thereof, whereby quantities of air will be forced rearwardly along the outer sides of said heater casing receiving heat through the radiation thereof, and will be caused to pass through said heater casing in a forwardly direction and into the interior of the automobile adjacent the driver's seat. The heater as disclosed is especially applicable to cars having an exhaust pipe curved beneath the inclined foot boards where a relatively short straight section of the exhaust pipe is employed. Such cars include the Dodge, Oldsmobile, Willys Knight, Buick, Nash and many other standard automobiles.

The above and other objects will be apparent from the following description made in connection with the accompanying drawings, wherein like characters refer to similar parts throughout the several views, and in which;

Fig. 1 is a fragmentary longitudinal section through the body of an automobile, showing a preferred embodiment of the invention attached to the exhaust pipe thereof;

Fig. 2 is a vertical section taken on the line 2—2 of Fig. 1 showing the intake passage disposed about the heater casing;

Fig. 3 is a vertical section taken on the line 3—3 of Fig. 1 showing the communication of said intake passage with said heater casing, and;

Fig. 4 is a section taken on the line 4—4 of Fig. 1 showing the delivery passage connected to the forward portion of the heater casing.

In the drawings, a portion of an automobile body is illustrated having the floor or foot boards 5, a front seat 6, the downwardly curved exhaust pipe 7, and the muffler 8.

In general my invention comprises a main or heater casing designated as an entirety by the letter A, having an upwardly inclined forward end, an intake casing B disposed about the heater casing and communicating with the rear thereof and a discharge passage C communicating with the interior of the automobile through the floor portion 5.

Heater casing A preferably is formed in two sections, each comprising a pair of flanged substantially semi-cylindrical shells. The rear section adapted to surround the straight portion of the exhaust pipe 7 is made up of shell members 9 having the relatively narrow upper flanges 9$^a$, and the relatively wide lower flanges 9$^b$. The forward end of this section is connected with the inclined section of the heater casing comprising semi-cylindrical shell members 10 having equal relatively narrow flanges 10$^a$ at the top and bottom.

The intake passage or casing B is of somewhat larger diameter than heater casing A and is superimposed about the latter and comprises the shell members 11 eccentrically alined with shell members 9 and carrying the equal flanges 11$^a$ at the tops and bottoms thereof. Flanges 11$^a$ are clamped together about the flanges 9$^a$ and 9$^b$ respectively of the heater casing preferably by means of a plurality of nutted bolts 12. It will be seen that the relatively wide flanges 9$^b$ of shell members 9 permit said casing to be eccentrically alined and secured in the manner described.

The forward end of intake casing B is left open and cut to partially embrace the lower portion of the forward section of the heater casing leaving a funnel portion 13 adapted to receive a current of air when the car is in motion. The rear end of intake casing B is closed by means of collar members 14 and clamped about the exhaust pipe 7 adjacent the muffler 8. The rear end of heater casing A terminates short of the rear end of intake casing B and is left open to communicate therewith, while the forward end of heater casing A is provided with a discharge casing 15 secured to one side thereof through the flanges. The inner shell member 10 is cut off rearwardly of the forward end of the heater to accommodate discharge casing 15, which with the forward end of the heater is secured in proper spaced relation about the curved portion of the exhaust pipe clamped by means of suitable collars 16 also closing the forward end of the heater casing.

The upper end of the discharge casing 15 is adapted to project through one of the floor boards 5 and have mounted thereover a valve or register 17 of any suitable type.

The operation of the above described device may be briefly summarized as follows:

Quantities of air will be forced through the intake casing B by the forward movement of the vehicle and also to some extent by the current set up through the engine fan (not shown). This air entering funnel portion 13 of intake casing B will pass along the sides of the rear section of heater casing A, being heated to some extent in its passage by the radiation from said heater casing. The partially heated air will be admitted to the rear end of the heater casing, where in seeking its higher level it will pass slowly forwardly over the hottest portion of the exhaust pipe and into the discharge casing C. The supply of heated air to the interior of the automobile may, of course, be controlled by the register 17.

It will, therefore, be seen that the air before entering the heater casing will be partially warmed and will be heated to a high temperature in its slow movement through the heater casing.

The construction of the inclined forward end of the heater casing A enables the device to be readily attached to the curved portion of an automobile exhaust pipe, the angle between the two sections of the heater casing substantially conforming to the curve of the exhaust pipe. The actual usage of my device has shown the same to be highly efficient for the purposes enumerated.

It will, of course, be understood that various changes may be made in the form, details, proportions and arrangement of parts without departing from the scope of the invention.

What is claimed is:

1. An automobile heater comprising a heater casing adapted to enclose a portion of the exhaust pipe of an automobile, an air intake passage surrounding a portion of said heater casing and spaced therefrom and communicating with said heater casing adjacent the rear end thereof, said intake passage being open at its forward end, whereby a current of air will be set up passing rearwardly over said heater casing longitudinally thereof and passing through said heater casing in a forward direction, and discharge means connected with said heater casing.

2. An automobile heater comprising an inner casing adapted to enclose a portion of the exhaust pipe of an automobile, and having an intake passage adjacent the rear end and a discharge passage adjacent the forward end, an outer casing surrounding the rear portion of said inner casing and spaced therefrom, said inner casing terminating short of the rear end of said outer casing, and said outer casing having an opening adjacent its forward end to admit the passage of air, whereby a current of air will be set up through said inner casing flowing in a forwardly direction.

3. An automobile heater having in combination a heater casing, comprising shell members adapted for disposition about the exhaust pipe of an automobile, an intake casing superimposed about and spaced from said heater casing and having an entrance into the space between said casings and adjacent the forward portion of said casing, and having its rear end closed about said exhaust pipe, the rear end of said heater casing terminating short of the rear end of said intake casing to communicate with the same, and means adjacent the forward end of said heater casing for delivering heated air to the interior of the automobile.

4. An automobile heater comprising a heater casing adapted to enclose a portion of an exhaust pipe, having a substantially straight portion and an upwardly extended portion adapted to substantially enclose the curved portion of said exhaust pipe, a substantially straight intake casing superimposed about and spaced from said heater casing and communicating with the rear end thereof, the forward end of said intake casing being open and disposed below the inclined end of said heater casing, and means for delivering heated air from the forward portion of said heater casing to the interior of the automobile.

5. An automobile heater comprising a heater casing adapted to enclose a portion of the exhaust pipe of an automobile, an air intake casing surrounding said heater casing and communicating with said heater casing adjacent the rear end thereof, said intake casing being open adjacent its forward end, said heater casing having a discharge passage that communicates with the interior of an automobile body, said heater casing and said intake casing both being formed of co-operating shell sections, said shell sections having registering longitudinal flanges and the flanges of said heater casing being wider than the flanges of said intake casing and being clamped between said last mentioned flanges to hold said casings in spaced relation.

In testimony whereof I affix my signature.

NELS A. OLUND.